United States Patent [19]

Veikley et al.

[11] Patent Number: 4,568,316
[45] Date of Patent: Feb. 4, 1986

[54] MULTIPLE SHEAVE MECHANISM WITH OVERLAPPING FIT

[75] Inventors: Gary L. Veikley, Duluth, Minn.; Kenneth W. Huck, Cedar Rapids, Iowa

[73] Assignee: FMC Corporation, Chicago, Ill.

[21] Appl. No.: 604,250

[22] Filed: Apr. 26, 1984

[51] Int. Cl.⁴ ............................................. F16H 57/04
[52] U.S. Cl. ...................................... 474/91; 474/168; 474/199
[58] Field of Search ................... 474/91, 168, 199, 43, 474/45; 384/417, 372, 377, 474, 480; 277/53, 55, 56

[56] References Cited

U.S. PATENT DOCUMENTS

| | | | |
|---|---|---|---|
| 2,473,513 | 6/1949 | Dewey | 384/480 |
| 2,740,647 | 4/1956 | Van Pelt | 277/56 X |
| 3,125,126 | 3/1964 | Engels | 384/417 X |

FOREIGN PATENT DOCUMENTS 2925872  2/1981  Fed. Rep. of Germany ...... 474/168
9498  6/1891  United Kingdom ............... 474/168

*Primary Examiner*—James A. Leppink
*Assistant Examiner*—Frank McKenzie
*Attorney, Agent, or Firm*—A. J. Moore; H. M. Stanley; R. B. Megley

[57] ABSTRACT

The multiple sheave mechanism is primarily intended for use on the outer end of a long boom of a crane. The mechanism includes a plurality of sheaves that have hubs supported for rotation on a shaft by anti-friction bearings. Each of the hubs have a cylindrical inner flange on one side and a cylindrical outer flange on the other side, and the hubs are axially spaced from each other with the outer flanges overlapping the inner flanges. The outer flange on one end sheave overlaps an annular retainer, and a second retainer overlaps the inner flange on the other end sheave. The cooperating flanges and retainers define circuitous passages which are filled with lubricant for providing a mechanical seal and a fluid seal which minimizes entry of dirt, dust and other debris into the bearings and maximizes the interval between required relubrication.

8 Claims, 3 Drawing Figures

FIG_1
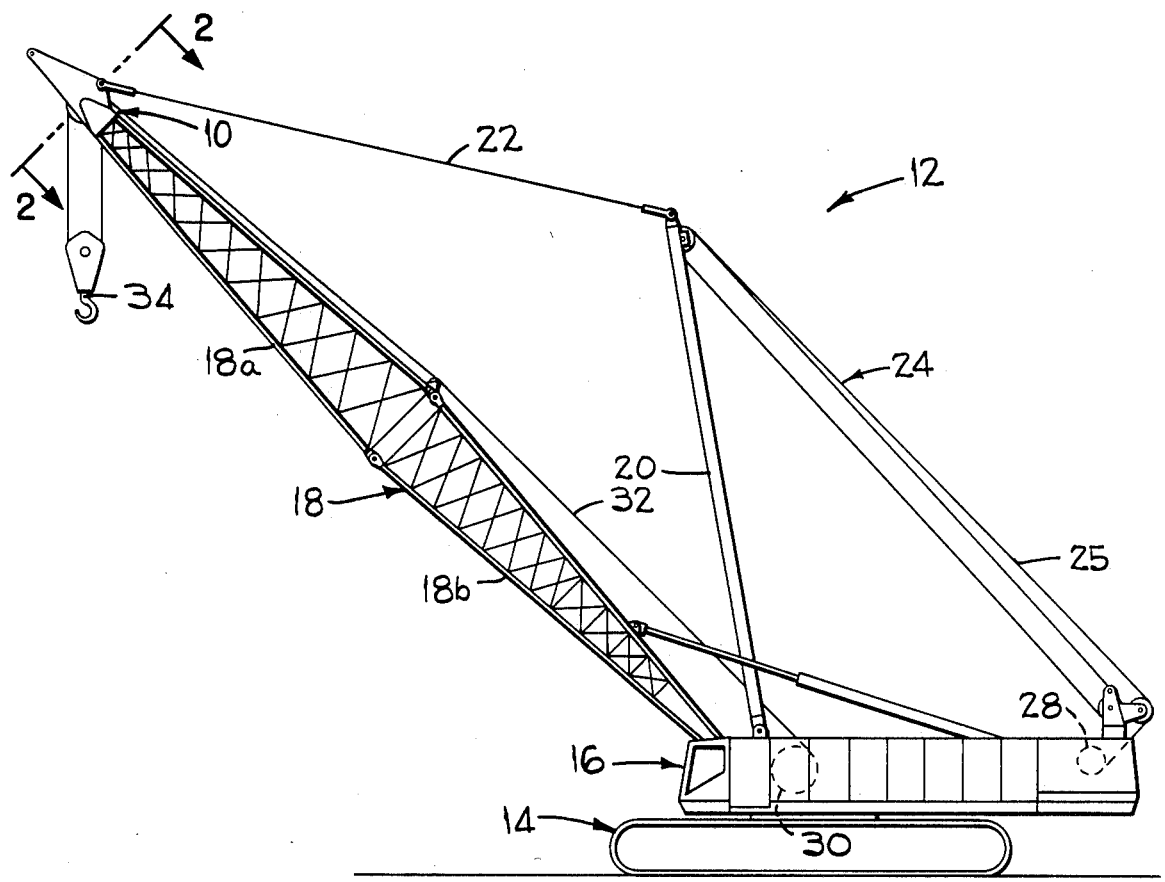

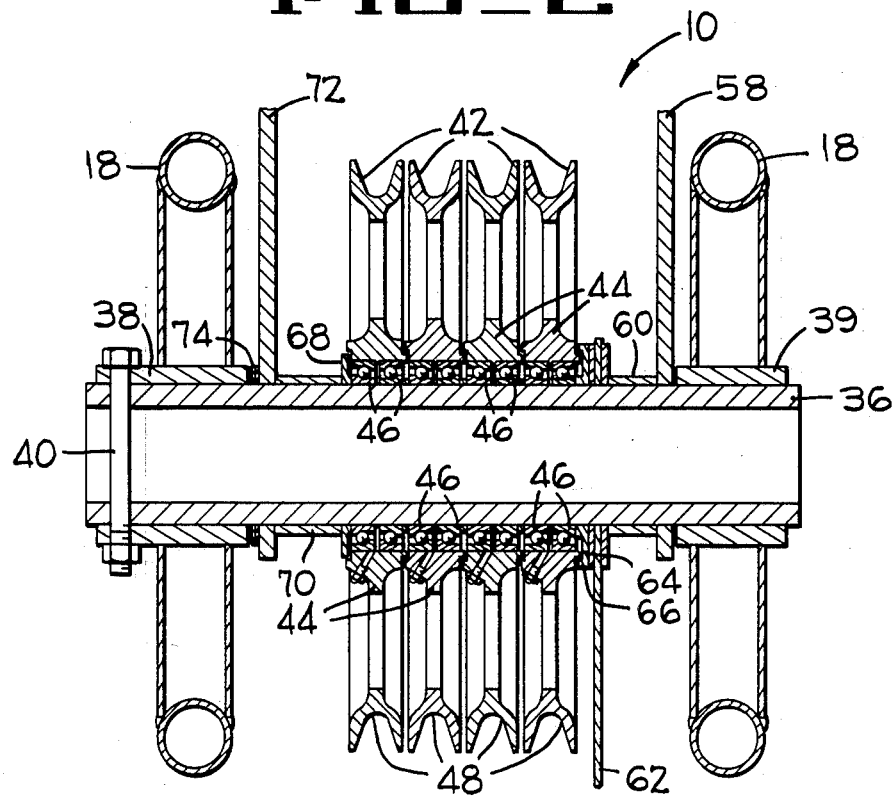
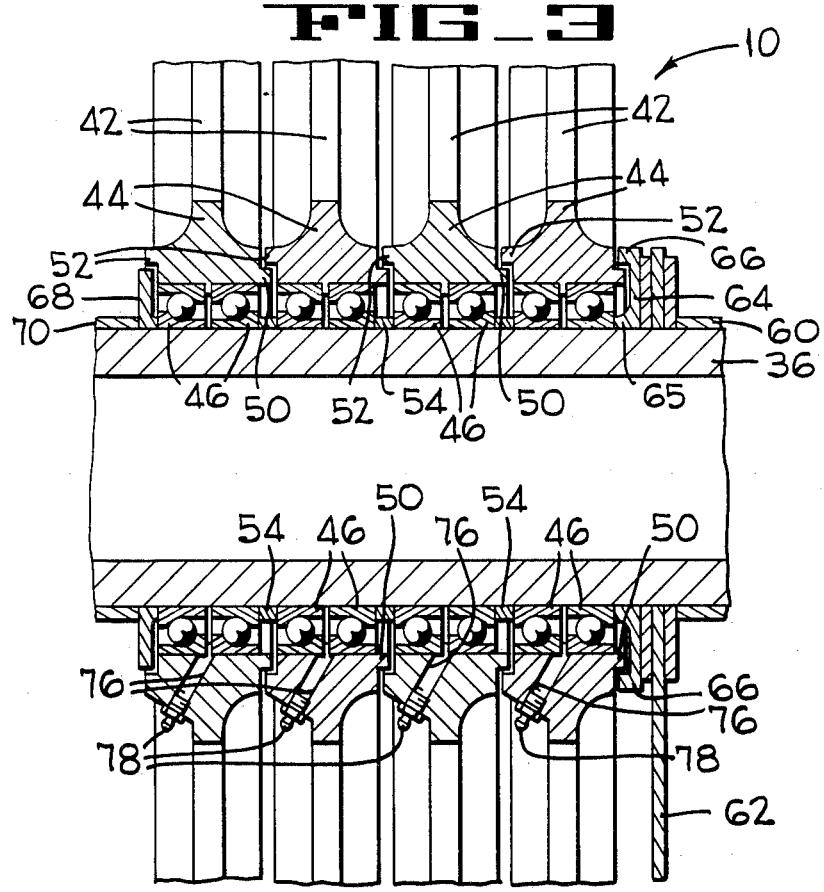

MULTIPLE SHEAVE MECHANISM WITH OVERLAPPING FIT

BACKGROUND OF THE INVENTION

Field of the Invention

The present invention relates to a multiple sheave mechanism with overlapping fit for minimizing contamination in sheave bearings, and more particularly relates to such an apparatus which is inexpensive and is used on sheave assemblies on the outer ends of tall booms of cranes or the like.

In conventional multiple sheave bearings used on the outer end of tall booms or the like the bearing must be lubricated at frequent intervals because of contamination of the lubricant by dust, dirt or other contaminants. Lubricating these bearings becomes time consuming and expensive especially when the booms are large and the outer ends of the booms have to be lowered to a location adjacent the ground during lubrication.

BRIEF DESCRIPTION OF THE DRAWINGS

FIG. 1 is a diagrammatic side elevation of a crane having the multiple sheave mechanism with overlapping fit mounted on the upper end thereof.

FIG. 2 is an enlarged section taken along lines 2—2 of FIG 1.

FIG. 3 is a fragmentary section similar to FIG. 2 but taken at an enlarged scale for showing the details of the invention.

DESCRIPTION OF THE PREFERRED EMBODIMENT

The multiple sheave mechanism 10 of the present invention is intended for use with large equipment such as a crane 12. The crane 12 includes a power driven lower works 14 with an upper works 16 supported on the lower works for pivotal movement about a vertical axis. The upper works pivotally supports a boom 18 and a live mast 20. The mast 20 is connected to the outer end of the boom by pendants 22, and a hoist 24 that includes a hoist line 25 connected between the outer end of the mast 20 and a winch 28 for raising and lowering the boom 18 in a conventional manner.

A load line winch 30 has a load line 32 trained thereover and includes multi-parts of line trained over the multiple sheave mechanism 10 of the present invention for raising and lowering a load attached to a multi-grooved hook block 34.

It will be understood that the boom 18 may be varied in length by adding or removing boom sections from between the two end sections 18a and 18b illustrated in FIG. 1. The boom length may be up to a maximum of about 450 feet and quite frequently is on the order of about 300 feet. Thus, lubricating the multiple sheave mechanism 10 requires lowering the outer end of the boom onto or near the ground.

The multiple sheave mechanism 10 (FIGS. 2 and 3) comprises a tubular headshaft 36 which is received in sleeves 38 and 39 secured to the outer end of the boom 18. A bolt 40 secures the shaft 36 to the sleeve 38. A plurality of sheaves 42, four being illustrated in FIGS. 2 and 3, each include a hub 44 which is bored to receive the outer race of a pair of antifriction bearings 46 while the inner race of each bearing is received on the tubular headshaft 36. Each sheave has a grooved outer peripheral surface 48 for receiving the load line 32 (FIG. 1).

An important feature of the invention is that each hub 44 (FIG. 3) is provided with an inner cylindrical flange 50 and an outer cylindrical flange 52 with the outer flange extending over the inner flange of the adjacent hub to provide an overlapping fit. Since the sheaves rotate relative to each other during operation, spacer rings 54 are provided to engage the inner races of adjacent bearings 46 for separating the sheaves from each other.

In order to center the multiple sheave mechanism 10 transversely of the boom, the right side (FIG. 2) of the headshaft 36 is encompassed by a pendant link 58, a cylindrical spacer 60, a dead end link 62 and a retainer ring 64 of a generally U-shaped cross section. The retainer ring 64 includes one leg 65 which engages the inner race of the adjacent bearing, and includes an outer leg 66 which extends over the inner annular flange 50 of the adjacent hub 44 to shield the adjacent bearing from contamination. Similarly, on the left side of FIG. 3; retainer 68, a cylindrical spacer 70, a second pendant link 72 and one or more shims 74 are provided for centering the multiple sheave mechanism 10 relative to the longitudinal centerline of the boom 18. It is apparent that the outer ends of the previously referred to pendants 22 (FIG. 1) are connected to the pendant links 58 and 72 in a conventional manner.

As best shown in FIG. 3, each hub 44 includes a threaded passage 76 which extends to the associated bearings 46 and has a grease fitting 78 screwed into its outer end. Conventional grease guns are used to fill the bearing cavities including circuitous passages between the inner flanges 50 and outer flanges 52 with grease.

In operation of the crane 12 or a similar apparatus, the crane operator must lower the outer end of the boom onto or near the ground. A mechanic then uses a conventional grease gun for injecting grease into all passages in the bearings 46 including the circuitous passages between the inner annular flanges 50 and the outer annular flanges 52. The boom is then elevated to working position, and the crane is operated in a normal manner.

It has been determined that the overlapping flanges minimize intrusion of dust, dirt and other contaminates into the bearings for a longer period than that of conventional multiple sheave mechanisms used on cranes or the like. When using a multiple sheave mechanism in accordance with the present invention, the use of cylindrical flanges and retainers physically prevent debris from entering the bearings and also provides circuitous passages filled with grease which further delay entry of contaminants into the bearings. Also, the multiple sheave mechanism is inexpensive as compared to using shielded bearings or separate shields to resist entry of contaminants into the bearings.

From the foregoing description it is apparent that the multiple sheave mechanism of the present invention is of inexpensive design and minimizes entry of contaminants including dust and dirt by providing physical barriers in the form of overlapping cylindrical flanges as a primary barrier and also providing grease filled circuitous passages to the bearings which define an additional barrier to contamination. The multiple sheave mechanism maximizes the interval between lubrication and is especially useful on the outer ends of tall booms, such as crane booms, since it is time consuming and expensive to lower the outer end of the boom to a position where the bearing can be lubricated.

Although the best mode contemplated for carrying out the present invention has been herein shown as described, it will be apparent that modification and variation may be made without departing from what is regarded to be the subject matter of the invention.

What is claimed is:

1. In a multiple sheave mechanism having a plurality of sheaves including end sheaves supported on a shaft by a plurality of bearing means, each of said sheaves including a hub and including means for directing a lubricant into said bearings; the improvement which comprises.
   means defining a cylindrical inner flange on one side of each hub;
   means defining a cylindrical outer flange on the other side of each hub;
   means for spacing the sheaves axially from each other with said outer flange overlapping associated inner flanges;
   first annular retaining means mounted on said shaft and positioned closely adjacent to and disposed partially within the outer cylindrical flange on the hub of one end sheave, and
   second annular retaining means mounted on said shaft and positioned closely adjacent to and partially encompassing the inner cylindrical flange on the hub of the other end sheave.

2. An apparatus according to claim 1 wherein said first and second retaining means defines a portion of said spacers means.

3. An apparatus according to claim 1 wherein said bearing means are anti-friction bearings.

4. An apparatus according to claim 1 wherein said bearing means, said spacer means, said first and second retaining means, and said inner and outer cylindrical flanges define circuitous passages filled with the lubricant, and wherein said retainers and inner and outer flanges and the lubricant retained in said passages define seals which minimize entry of dirt, dust and other contaminants into said bearings thereby minimizing the interval between required relubrication of the bearings.

5. An apparatus according to claim 4 and additionally comprising a power implement, a long boom pivotally supported on said implement and having an outer end, and means for raising the boom to a working position and lowering the outer end of the boom to a servicing position onto or closely adjacent to the ground, said multiple sheave mechanism being supported on the outer end of the boom and requiring that the outer end of the boom be lowered to a point adjacent the ground when said bearings are to be lubricated.

6. An apparatus according to claim 5 wherein said lubricant is grease.

7. An apparatus according to claim 5 and additionally comprising a load line trained over a portion of each sheave for driving said sheave at different speeds during operation.

8. An apparatus according to claim 1 wherein said second annular retainer means is of generally U-shaped cross section having cylindrical outer and inner legs, said outer leg overlapping said associated cylindrical inner flange, and said inner leg being mounted on the shaft and defining a part of said spacing means.

* * * * *